United States Patent Office 2,694,980
Patented Nov. 23, 1954

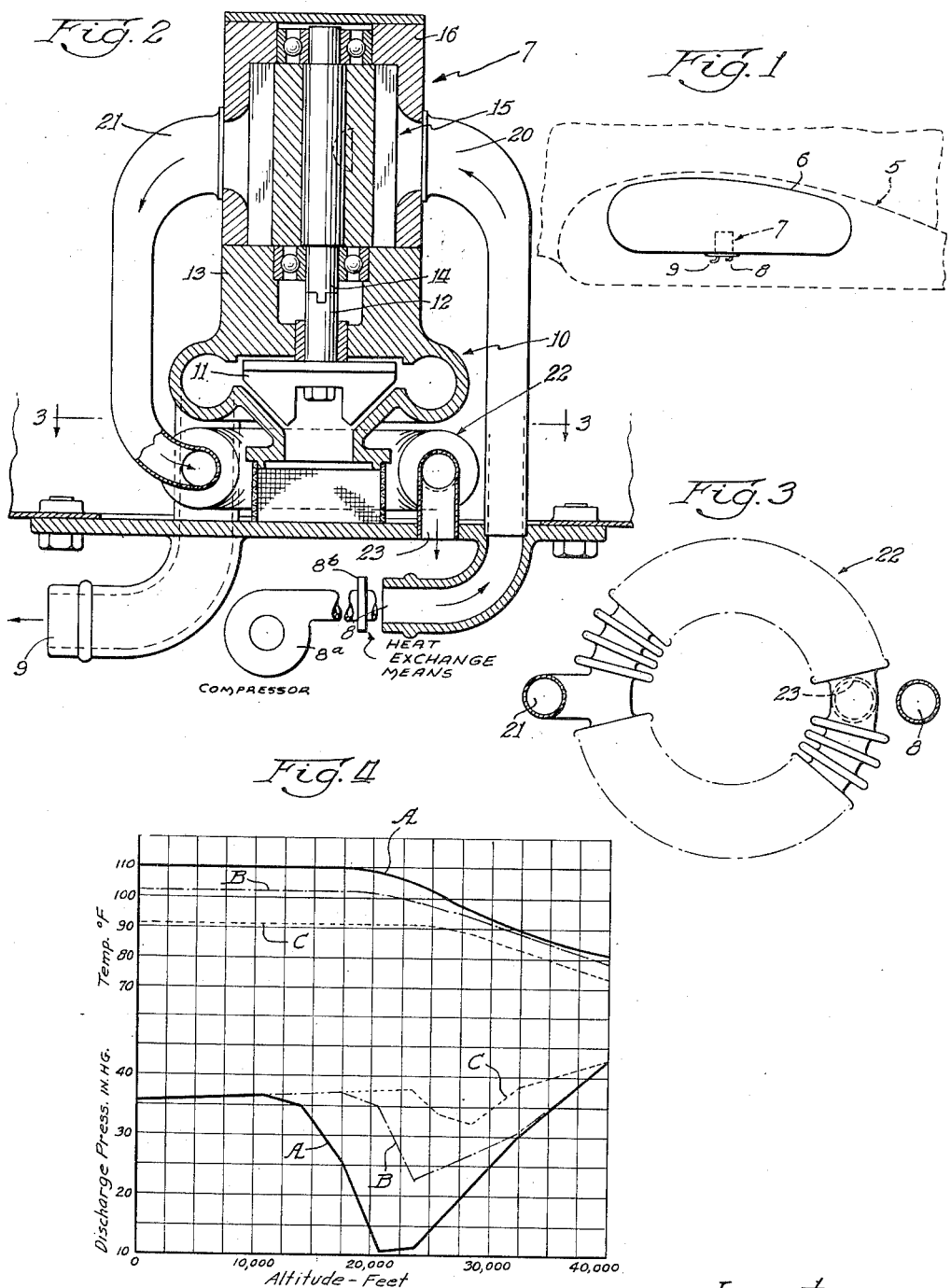

2,694,980

FUEL PUMPING SYSTEM

John A. Lauck, Shaker Heights, and James A. Compton, South Euclid, Ohio, assignors to Borg-Warner Corporation, Chicago, Ill., a corporation of Illinois Application November 7, 1951, Serial No. 255,153

14 Claims. (Cl. 103—87)

This invention relates to a fuel pumping system, and more particularly to a fuel pumping system for high altitude aircraft.

Because the vapor pressure of the high octane fuel used in aircraft is relatively high, that is, on the order of six to seven pounds per square inch at 100° F., as the aircraft rises from ground level to higher altitudes where the surrounding air pressure becomes low and often lower than the vapor pressure of the fuel, the fuel is subject to boiling and vaporization. This causes formation of bubbles in the fuel tank and pump inlet and it renders exceedingly difficult pumping of the fuel from the tank to the aircraft motor. To some extent, this undesirable condition can be mitigated by pressurizing the fuel in the tank, but this is considered dangerous and is particularly undesirable in military aircraft.

Another and more generally employed method of avoiding this condition is that disclosed in Burns Patent No. 2,513,992 wherein a propeller-type pump is employed in tandem with a centrifugal pump, the propeller agitating the fuel and causing return to the fuel tank of air bubbles—and also of considerable fuel. This propeller-type pump provides a supply of fuel to the centrifugal pump which is substantially free of occluded air and vapor bubbles and thus the centrifugal pump does not fail by cavitation and is able to develop the required pressure to the main fuel pump associated with the aircraft carburetor or fuel injection system. In this latter type of arrangement a considerable portion of the fuel is returned to the fuel tank and, also, because of the unavoidable low output of the propeller-type pump, the fuel supplied to the centrifugal pump is still at or very near the boiling point so that the performance of the centrifugal pump is limited by the adverse inlet conditions. Consequently, where such arrangement is employed with a fuel injection system, a third or main fuel pump is often required to develop the necessary, ultimate injection pressure. Furthermore, the efficiency of the arrangement drops as the surrounding air pressure drops and thereby the practical operational ceiling of the aircraft is limited. This complicated system naturally is heavier and more expensive than a system wherein a centrifugal pump alone would be able to supply the final fuel pressure.

It will be apparent from the foregoing that the approach to the problem heretofore has been primarily by adding mechanical structures which tend to increase the pumping pressure without actually attacking the fundamental problem except for those devices in which the tank is pressurized, and as pointed out hereinbefore, this is considered extremely dangerous and undesirable, particularly for military aircraft.

In accordance with the present invention the problem is attacked from an entirely different angle than heretofore by materially reducing the tendency of the fuel to boil without increasing the surrounding vapor pressure. Since the vapor pressure of any given fuel varies as a function of the temperature of the fuel, it will be evident that despite a decrease in the tank pressure of the fuel, such as occurs as the airplane reaches higher altitudes, if this decrease in pressure can be offset by a commensurate decrease in the temperature of the fuel, then the net result will be that the tendency of the fuel to boil as it enters the fuel pump and fuel lines will be unchanged. It will be apparent then that to the extent the temperature of the fuel may be controlled, the tendency of the fuel to boil, and of the pump to cavitate, may be reduced.

An object of the present invention is to provide a new and improved fuel pumping system and more particularly a fuel pumping system for high altitude aircraft.

A further object of the present invention is to provide a fuel pumping system wherein the vapor pressure of the fuel in the tank as admitted to the fuel pump is materially reduced by cooling the fuel as it enters the pump.

Another object of the invention is to provide an improved method for reducing the vapor pressure of a liquid to be pumped and more particularly to cool a liquid fuel or other volatile liquid before it enters a pump by utilizing the energy drop in the medium for driving the pump.

In accordance with one embodiment of this invention, a fuel pumping system for immersion in a fuel tank, such as, for example, a wing tank of an aircraft, may include a fuel pump and an air driven motor for driving the pump. A heat exchange mechanism comprising cooling vanes or a cooling ring is disposed about the inlet to the fuel pump and is cooled by supplying air thereto after the air has passed through the air driven motor and, therefore, having expanded, is relatively cool. By cooling the fuel as it is admitted to the pump, the vapor pressure of the fuel is materially reduced and the tendency to cavitation and boiling substantially minimized.

Other objects and advantages of the present invention will be apparent from the following detailed description taken in conjunction with the drawings wherein:

Fig. 1 is a schematic view of the fuel system of this invention incorporated in a fuel tank such as an aircraft wing tank;

Fig. 2 is a vertical axial, sectional view, partially in elevation of the fuel system shown in Fig. 2;

Fig. 3 is a transverse sectional view taken substantially along the line 3—3 of Fig. 2 and illustrating particularly the cooling arrangement; and Fig. 4 is a series of graphs illustrating the effect of temperature on pump performance throughout a wide range of altitude.

Referring first to the graphs shown in Fig. 4, wherein have been plotted the altitude performance characteristics of a particular fuel pump using identical fuels at three different temperatures, it will be evident that the temperature of the fuel is most critical to the performance of the pump at higher altitudes. Curve A represents a fuel at 110° F. on the temperature scale. On the discharge pressure scale it will be noted that under the given set of conditions at sea level with such a fuel, at this temperature a normal discharge pressure on the order of 36 inches of mercury is obtained. This pressure is maintained as the altitude is first increased and then at approximately 11,000 feet begins to fall off. At 20,000 feet the failure of the pump is substantially complete.

Curve B represents a fuel at 102° F. and here it will be seen that failure commences at approximately 17,000 feet and falls off critically at 23,000 feet. This failure at 23,000 feet is sufficient to cause flight failure.

Curve C represents a fuel at a temperature of 90° F. At this temperature there is a decrease in pumping efficiency commencing at approximately 23,000 feet, but it is not serious and is not enough to cause flight failure.

All three of these curves have been continued to show the response of discharge pressure to a decrease in temperature, and it will be seen that there is a marked increase in discharge pressure as the temperatures of the fuels are reduced. From these curves it will be apparent that a reduction in fuel temperature of less than 20° F. can mean the difference between failure at relatively low altitude or continued operation. Such a reduction is made possible by employing a pump provided with a cooling system in accordance with the present invention.

Referring now to Figs. 1 and 2, reference numeral 5 designates a wing of a plane having therein a fuel tank 6, in the lower wall of which is mounted a fuel pump assembly 7. The fuel pump assembly 7 is, in accordance with this invention, of the air driven type and is supplied with air by duct 8 which is connected to a suitable source of air pressure such as a compressor 8a which provides air under pressure which may be passed through heat exchange or intercooler means 8b if necessary. Fuel from the pump assembly 7 is communicated to the plane engine (not shown) with which the pump assembly is associated through line 9.

In more detail, the fuel pump assembly 7 comprises a centrifugal pump 10 having a rotor 11 mounted on a shaft 12, which is journalled in a pump assembly housing 13. The upper end of the shaft 12 is keyed to the lower end of a shaft 14 associated with an air driven motor 15, supplied with air pressure through duct 8. The motor 15 may comprise a housing portion 16 in which are disposed, for example a pair of meshing, rotatable members, one of which is mounted in driving relation on the shaft 14. Rotation of the air driven motor 15 causes rotation of shaft 14 and in turn drives the centrifugal pump rotor 11.

Air entering the pump assembly through the duct 8 is communicated to the motor housing 16 through passage 20. Air entering the motor is under very high pressure but, after the air has passed through the motor and caused rotation of the motor elements, the air will have expanded and given up heat. Accordingly, the air discharge from the motor is substantially cooler than the air entering the motor. In one actual embodiment it has been found that this difference is on the order of 100° to 150° F., depending on the initial temperature of the air in duct 8. Accordingly, there is provided a source of relatively cold air, and by bringing this cold air in thermal contact with the fuel as the fuel enters the inlet of the centrifugal pump, the fuel may be cooled. It will be readily apparent that this source of relatively cool air may include the intercooler means 8b for initially reducing the temperature of the air from the compressor before it enters the motor 15 since the law of conservation of energy illustrates the impossibility of reducinng the temperature of the air leaving the motor 15 below the temperature of the air entering the compressor 8a if there is no heat loss in the air traveling between the compressor and the motor. In practice the intercooler means 8b may be merely a non-insulated duct of substantial length, for example, twenty feet, or it may comprise any type of conventional heat exchanger utilizing ram air as the cooling fluid. It is, of course, not practical to attempt to cool the fuel in the tank, and is, in fact, unnecessary, it being adequate to cool the fuel actually being supplied to the pump.

Thus, in accordance with the present invention, the air discharge from the air motor 15 is communicated through a passage 21 to an annular radiator or heat exchange means 22, which encircles the inlet of the centrifugal pump. The precise construction of the radiator 22 forms no part of the present invention, it being necessary only that the radiator 22 expose a relatively large area to the fuel so that the fuel in passing through the ring is subjected to the cooling effect of the heat exchange means to the maximum extent feasible commensurate with providing an uninterrupted flow of fuel to the inlet of the pump. The radiator is located immediately adjacent to the fuel pump inlet and thus its cooling effect is utilized to the maximum without dissipation thereof in attempting to cool the fuel in the tank 6.

As may be seen, air enters the radiator 22 from the left side thereof, as viewed in Fig. 2, passes in either direction around the annulus and escapes through a port 23 formed in the side of the radiator opposite the inlet port thereof whereby the radiator is completely subjected to the cooling effect of the air. Air escaping through port 23, escapes to atmosphere, it being desirable that there be minimum back pressure.

It has been found in actual tests that employing the cooling arrangement of the present invention in conjunction with a fuel pump, there is a very marked reduction in fuel temperature entering the fuel pump, and consequently the tendency to cavitation and fuel pump failure is proportionately reduced so that pumping efficiency is maintained even at altitudes in excess of 40,000 feet, and under which conditions the pump without such cooling arrangement would normally be expected to fail completely. In the actual embodiment referred to above, a fuel temperature drop in excess of 10° F. was readily achieved under relatively adverse conditions while under more favorable conditions, substantially greater temperature drops may be provided.

Where herein the elements of this invention have been referred to as being located in a right or left position or an upper or lower position, it will be understood this is done merely for the purpose of facilitating description.

While but one embodiment of this invention has been shown and described, it will be understood that many changes and modifications may be made therein without departing from the spirit or scope of the present invention.

What is claimed is:

1. In a method for pumping a liquid, the steps comprising supplying a gas under pressure at a given temperature to an expansion motor, withdrawing energy by expanding the gas in said motor to a pressure which cools said gas to a temperature below the temperature of the liquid to be pumped, passing the cooled gas through one side of a heat exchanger, passing the liquid to be pumped through the other side of the heat exchanger to cool the liquid before it enters the pump, passing the cooled liquid through the pump and utilizing the energy delivered by the motor to drive the pump.

2. In a method for pumping a liquid, the steps comprising supplying a gas under pressure, lowering the temperature of the gas below the temperature of the liquid to be pumped by absorbing mechanical energy from the gas, utilizing the energy absorbed from the gas for driving a pump for pumping the liquid, utilizing the cooled gas for cooling the liquid before it enters the pump, and passing the cooled liquid through the pump.

3. In a method for pumping a volatile liquid while preventing vaporization of the liquid, the steps comprising supplying air under pressure at a given temperature, withdrawing energy from the air by expanding the air to a pressure which lowers its temperature below the temperature of the fluid to be pumped, utilizing the energy withdrawn from the air to drive a pump to pump the liquid, utilizing the expanded air for cooling the liquid to lower its vapor pressure before the liquid enters the pump, and passing the cooled liquid through the pump.

4. In a method for pumping a volatile liquid while preventing vaporization of the liquid, the steps comprising supplying air under pressure at a given temperature, withdrawing energy by expanding the air in an expansion motor to a pressure which lowers the temperature of the air below the temperature of the liquid to be pumped, utilizing the energy delivered by the motor to drive a pump, pumping the liquid by means of the pump, passing the cooled air through one side of a heat exchanger, and cooling the liquid before it enters the pump by passing the liquid through the other side of the heat exchanger.

5. In a method for pumping a volatile liquid, the steps comprising supplying compressed gas at a given temperature, withdrawing energy from the gas by expanding the gas through an expansion motor to a pressure which further cools the gas to a temperature below the temperature of the liquid to be pumped, passing the further cooled gas through one side of a heat exchanger, passing the liquid to be pumped through the other side of the heat exchanger, pumping the liquid cooled by the heat exchanger by means of a pump, and utilizing the energy delivered by the motor to drive the pump.

6. In a method for pumping a volatile liquid, the steps comprising supplying compressed gas at a given temperature, withdrawing energy from the gas by expanding the gas through an expansion motor to a pressure which further cools the gas to a temperature below the temperature of the liquid to be pumped, utilizing the further cooled gas for cooling the liquid to lower its vapor pressure before the liquid enters the pump, and passing the cooled liquid through the pump.

7. In a method for pumping a volatile liquid, the steps comprising supplying compressed gas at a given temperature, withdrawing energy from the gas by expanding the gas to a pressure which further cools the gas to a temperature below the temperature of the liquid to be pumped, utilizing the energy withdrawn from the gas for driving a pump to pump the liquid, utilizing the expanded gas for cooling the liquid to lower its vapor pressure before the liquid enters the pump, and passing the cooled liquid through the pump.

8. In a method for pumping a volatile liquid fuel while preventing vaporization of the fuel, the steps comprising supplying compressed air at a given temperature, withdrawing energy from the air by expanding the compressed air through an expansion motor to a pressure which cools the air to a temperature below the temperature of the fuel to be pumped, passing the further cooled air through one side of a heat exchanger, passing the fuel to be pumped through the other side of the heat exchanger to cool the fuel before it enters the pump, and pumping the fuel cooled by the heat exchanger by means of the pump.

9. In a liquid pumping system, a pump for pumping the liquid and having an annular inlet, means for supplying an energy medium, energy absorbing means arranged to utilize a portion of the energy of the medium for driving the pump to thereby reduce the heat energy level of the medium below the heat energy level of the liquid before it enters the pump, and an annular heat exchanger disposed about the annular inlet to said pump and arranged to utilize the reduced energy medium from the energy absorbing means for absorbing heat energy from the liquid before it enters the pump to thereby cool the liquid.

10. In a liquid pumping system, a pump for pumping the liquid and having an annular inlet, means for supplying air under pressure, energy absorbing means arranged to utilize a portion of the energy of the air under pressure for driving the pump to thereby reduce the temperature of the air below the temperature of the liquid before it enters the pump, and an annular heat exchanger disposed about the annular inlet to said pump and arranged to receive the reduced temperature air from the energy absorbing means for absorbing heat energy from the liquid as it passes the heat exchanger before it enters the pump inlet to thereby cool the fluid.

11. In a liquid pumping system, a pump for pumping the liquid and having an annular inlet, means for supplying air under pressure, air motor mechanism drivingly associated with said pump and arranged to utilize a portion of the energy of the air under pressure for driving the pump to thereby reduce the temperature of the air below the temperature of the liquid before it enters the pump, and an annular heat exchanger disposed about the inlet to said pump for receiving the reduced temperature air within the heat exchanger whereby the liquid passes the heat exchanger before it enters the pump to thereby cool the liquid.

12. In a liquid pumping system, a source of liquid, a pump for pumping liquid from said source and including an annular inlet, means for supplying air under pressure, an expansion motor arranged to expand the air under pressure for driving the pump and to thereby reduce the temperature of the air below the temperature of the liquid in said source, and an annular heat exchanger located about and immediately adjacent to said pump annular inlet and arranged to utilize the reduced temperature air for absorbing heat energy from the liquid before it enters the pump inlet to thereby cool the liquid.

13. In a liquid fuel pumping system, a fuel pump having an annular inlet, means for supplying fuel to said pump, a source of air under pressure, an air driven expansion motor arranged for driving said fuel pump by expanding the air to thereby reduce the temperature of the air below the temperature of the fuel before it enters the pump, and an annular heat exchanger disposed about the pump inlet between the fuel supply means and the pump and arranged to receive the reduced temperature air within the heat exchanger for absorbing heat energy from the fuel which passes the heat exchanger before it enters the pump inlet to thereby increase the temperature of the air and reduce the temperature of the fuel.

14. In a liquid pumping system, a liquid pump having an inlet port, means for supplying liquid to said pump inlet port, means for supplying gas under pressure, a gas driven motor driving said pump by absorbing energy from the gas under pressure thus reducing the temperature of the gas below the temperature of the liquid before it enters said pump inlet port, heat exchanging means surrounding said fuel inlet port in close proximity thereto whereby liquid passing into said inlet port moves in close proximity to said heat absorbing means, and means for communicating the cooled gas discharged from the gas driven means to said heat absorbing means to absorb heat from the liquid passing into said inlet port to reduce the temperature of the liquid.

References Cited in the file of this patent

UNITED STATES PATENTS

| Number | Name | Date |
|---|---|---|
| 2,300,332 | Avigdor | Oct. 27, 1942 |
| 2,325,931 | Avigdor | Aug. 3, 1943 |
| 2,346,372 | Foottit et al. | Apr. 11, 1944 |

FOREIGN PATENTS

| Number | Country | Date |
|---|---|---|
| 600,478 | France | Feb. 8, 1926 |